UNITED STATES PATENT OFFICE.

ALBERT WILHELM REHNSTRÖM, OF MÄHLHAMMAR, ASSIGNOR TO THE LACTOSERINE COMPANY, LIMITED, OF STOCKHOLM, SWEDEN.

MANUFACTURE OF SOAP WITH WHEY.

SPECIFICATION forming part of Letters Patent No. 476,555, dated June 7, 1892.

Application filed August 28, 1890. Serial No. 363,348. (No specimens.) Patented in Sweden November 28, 1889, No. 2,290.

*To all whom it may concern:*

Be it known that I, ALBERT WILHELM REHNSTRÖM, a subject of the King of Sweden and Norway, residing at Mählhammar, Rekarne, Sweden, have invented certain new and useful Improvements in the Manufacture of Soap with Whey, (for which Letters Patent have been granted in Sweden, No. 2,290, November 28, 1889;) and I declare the following to be so full, clear, and exact a description of the same as to enable others skilled in the art to practice the invention.

Heretofore in the manufacture of soaps, and more particularly in the manufacture of toilet and shaving soaps intended for use on the human skin, certain ingredients have been combined with the soap mass in the process of manufacture with a view to soften the skin, allay irritation, removing sunburn, &c.

The object of this invention is to utilize the well-known emollient or cosmetic properties of whey in the manufacture of soaps; and to this end the invention consists, broadly stated, in soap prepared by addition to the soap mass of concentrated whey.

The soap is prepared in the following manner: If only part of the constituents of the milk is to be retained in the concentrated milk, the superfluous ones are first removed from the milk. This is, as to the fat, most conveniently effected by means of separation, as by skimming, and as to the caseine by means of coagulation and straining off the caseine. When the fat as well as the caseine has been removed from the milk, the remainder is whey, which contains sugar of milk and salts, such as phosphate of lime, magnesia, oxide of iron, chloride of potassium, chloride of sodium, and sodium oxide, together with some residue of caseine, fat, and albumen. The milk, with all or a part of its natural constituents, is then subjected to evaporation in the usual manner in well-known vessels suitable for the purpose, and the evaporation is continued either to dryness or up to the consistency of porridge or up to different degrees between such consistency and dryness. This concentrated milk or concentrated mass of part of the constituents of the milk is then ready for mixing it in the soap mass prepared separately. The soap mass is produced in the usual manner by saponifying, under boiling, some suitable fat with a sufficient quantity of alkali. As fat I may use cocoanut-oil, palm-oil, tallow, milk-fat, or other fats suitable for the preparation of soap, and, as alkali, soda or potash lye may conveniently be used. Soda-lye is used if the production of solid soap and potash-lye is used if a soft or liquid soap is to be produced. The soap mass is prepared by saponifying the fat with the alkali in the manner universally known and in the proportions customary for the saponification—as, for instance, twenty-two per cent. cocoanut-oil, 4.5 per cent. caustic soda, and 73.5 per cent. water. If the more or less concentrated milk intended to be immersed into the soap mass contains fat in a greater or smaller degree, an excess of alkali ought to be left in the soap mass obtained by the saponification, which excess of alkali can saponify this fat. The less the concentrated mass contains of fat the more neutral the soap mass ought to be at the time the milk mass is combined therewith.

The soap is then produced in the following manner: When the soap mass has been boiled and preferably completely saponified, as above described, and when its temperature has been reduced to about 50° to 80° centigrade, a quantity of the whey is added under constant stirring after the removal of the sub-lye. The concentrated whey added can conveniently be twenty-five per cent. of the weight of the soap mass; but it is evident that these proportions may essentially vary. When the stirring has been continued until a homogeneous mass has been obtained, this mass is left to cool and is then worked between rollers or another suitable apparatus until a perfectly-uniform soap mass has been obtained. Some coloring-matter, if wanted, and perfume are mixed into the mass when working it. When the soap mass has cooled and the desired consistency has been obtained, the same is in the usual manner pressed into molds. If the soap mass is liquid, the addition of the whey takes place by stirring the mass until the whole mass has become homogeneous. The mixture of the concentrated whey with the soap mass can also take place after the ready-boiled soap mass has cooled, and is then affected in such a way that the cooled soap mass is broken and either not at all heated or heated to a rather low degree, and after the mixing of the whey the mass is treated in the manner set forth heretofore between rollers for obtaining a homogeneous mass. After being worked between the rollers the mass is treated in the way customary at the preparation of soap for molding the same.

It is evident that the proportion stated above between the soap mass and the whey can be varied without departing from this invention, wherefore the latter is not to be considered as restricted to particular proportions.

What I claim is—

1. The herein-described process of making soap, consisting in concentrating whey up to the consistency of porridge or to dryness, combining fat and alkali to produce a saponified mass, and intimately combining the concentrated whey and the saponified mass, substantially as set forth.

2. A soap into which concentrated whey is mixed, substantially as set forth.

In witness whereof I have hereunto signed my name in the presence of two subscribing witnesses.

ALBERT WILHELM REHNSTRÖM.

Witnesses:
NERE A. ELFWING,
ERNST SVANQVIST.